United States Patent [19]

Free, Jr. et al.

[11] Patent Number: 4,897,797
[45] Date of Patent: Jan. 30, 1990

[54] PROPORTIONAL CHEMICAL FEEDING SYSTEM

[75] Inventors: Jerome J. Free, Jr., Lansdale; James C. Rodgers, Pipersville; Davie B. Lawhon, Furlong, all of Pa.

[73] Assignee: Betz Laboratories, Inc., Trevose, Pa.

[21] Appl. No.: 185,752

[22] Filed: Apr. 25, 1988

[51] Int. Cl.⁴ .................. G06F 15/46; G01M 19/00
[52] U.S. Cl. ........................... 364/500; 73/168; 73/223; 364/502; 364/550; 364/571.01; 417/18
[58] Field of Search ............... 364/500, 502, 497, 550, 364/571.01; 73/3, 447, 452, 168, 861.44, 223; 340/612, 618; 222/37, 14, 63, 71; 417/18, 22, 63

[56] References Cited

U.S. PATENT DOCUMENTS

| | | | |
|---|---|---|---|
| 2,826,067 | 3/1958 | Braunlich | 73/168 |
| 4,016,079 | 4/1977 | Severin | 364/502 |
| 4,171,638 | 10/1979 | Coman et al. | 73/168 |
| 4,300,909 | 11/1981 | Krumhansl | 364/500 |
| 4,322,972 | 4/1982 | Karjala | 73/168 |
| 4,331,262 | 5/1982 | Snyder et al. | 222/37 |
| 4,389,886 | 6/1983 | Korczak | 73/168 |
| 4,422,152 | 12/1983 | Kaufmann | 364/502 |
| 4,530,465 | 7/1985 | Gauchet et al. | 73/223 |
| 4,568,465 | 2/1986 | Davis et al. | 364/500 |
| 4,648,043 | 3/1987 | O'Leary | 364/502 |

Primary Examiner—Kevin J. Teska
Attorney, Agent, or Firm—Caesar, Rivise, Bernstein, Cohen & Pokotilow

[57] ABSTRACT

In a treatment system for feeding a liquid from a tank having an outlet by a controllable pump operated cyclically, an automatic calibration/measuring system. The system is arranged for determining the volume of liquid pumped each cycle of operation by the pump and comprises a hollow sight glass having first and second sensors coupled thereto. The sight glass is in fluid communication with the tank. The first sensor is arranged to provide a first signal when the level of liquid in the container reaches it while the second sensor, which is located below the first sensor, provides a second signal when the level of liquid in the container reaches it. The container defines a predetermined volume between the first and second sensors. The system also includes a controller to determine the actual number of cycles of operation of the pump required to pump the predetermined volume and if that number has deviated from a preestablished number. If so, the pump is controlled in response to the detected deviation. The system also enables the quantity of liquid in the tank and its specific gravity to be determined.

17 Claims, 6 Drawing Sheets

PROPORTIONAL CHEMICAL FEEDING SYSTEM

BACKGROUND OF THE INVENTION

This invention relate generally to chemical treatment systems and more particularly for systems for effecting calibrated, proportional control of a chemical treatment system.

In the preferred technique for treatment of water (or some other liquid) with another liquid, e.g., a chemical, the chemical feed rate has to be established and must vary dynamically with the flow of water or other liquid that is to be treated. The ratio of treatment liquid to treated liquid is typically defined in Parts Per Million (PPM) and should remain constant at all flow rates so that results and cost are optimized. To accomplish that end, the technique known as "proportional feed" is utilized. The achievement of "proportional feed" has been accomplished typically by the use of a proportional loop-controller having an associated pump and flow meter.

In particular, the loop-controller system operates on the assumption that the chemical pump delivering the chemical from a storage tank is pumping the correct volume per stroke. Thus, tests must be run periodically to ensure that the system is working, is calibrated properly, and the tank or drum storing the testing chemical is not empty. While such operations are effective, they are nevertheless costly and labor intensive.

An alternative manner of effecting water treatment is to set the chemical pump feed rates at representative or average conditions, and thus not proportion the chemical feed rate to dynamic flow rates. Treating chemicals based on "average" conditions necessarily leads to overtreatment during some periods of time and undertreatment during other periods. Thus, while costs may not be excessive using this technique, the results frequently suffer. Yet another technique utilizes the feeding of excess chemical to handle the hightest flow rate. As will be evident, this technique leads to overfeed during some conditions. Thus, while the results of this technique are usually acceptable, the costs can be excessive. In view of the foregoing, it is generally accepted that proportional feed is the optimum treatment technique for most applications. To accomplish true "proportional feed", the feed rate of the treatment chemical must not only be varied directly with the treated liquid's (e.g. water) flow rate, but must also take into account changes in the pump's stroke volume, that is, the volumetric output of the pump.

It has been a practice in the past to manually calibrate the pump, that is, interrupt the treatment operation to determine the stroke output of the pump and then manually adjust the pump in the event that its output has deviated from a predetermined value. Obviously, such a manual technique is less than optimum.

It has also been suggested in the patent literature to control or calibrate a pump automatically. For example, in U.S. Pat. No. 4,322,972 (Karjala) there is disclosed a method and apparatus for the verification an calibration of pumping rates in systems having a volumetric pump drawing fluid from a tank. An effluent valve is connected to the base of the tank and the valve is, in turn, connected to the base of a calibrated column which is relatively small in cross sectional area compared to the tank. The liquid is drawn from the column during normal pumping operation as well as during a calibration cycle. When it is desired to measure the flow, the column is isolated from the storage tank by closing the tank's effluent outlet valve. After a specific period of time, e.g., a minute or more, the decrease in liquid level within the column is measured and the flow rate calculated. The effluent valve is then reopened without having disturbed the system or having turned off the pump, allowing the same pump or flow rate to continue. At this point, the operator of the system can adjust the pump to provide a different rate. It is also stated that the calibration method and apparatus can be automated.

U.S. Pat. No. 4,331,262 (Snyder, et al.) discloses an automatic fluid dispenser including a pump and counter means to count the number of incremental volumes. The volume of fluid delivered in the selected number of increments is determined either automatically or by an observer in a calibration procedure. A computer is provided to compare the volume of fluid delivered with the number of increments required to deliver that volume and to determine a "calibrated value" therefrom. This value is stored in the memory of the computer. Calibration means are provided to issue a command to the computer to store the calibrated value and controller means are provided for causing the fluid dispenser to deliver a selected volume of fluid either as a single dose or repetitively.

U.S. Pat. No. 2,826,067 (Braunlich) discloses testing apparatus for determining the delivery rate of a pulse type pump. The apparatus includes a calibration cylinder connected to the outlet of the pump through a valve. A float is provided in the column to provide a signal indicative of the rate of descent of liquid in the column, thereby indicating the pump rate. This signal is provided to a recorder to provide an indication of variations in the pump rate or to stop the pump when the delivery rate is below or exceeds a preset level.

OBJECTS OF THE INVENTION

While all of the above systems are suitable for their intended purposes, all suffer from one or more drawbacks.

Accordingly, it is a general object of the instant invention to provide a system for automatically measuring the output of a pump used to introduce a treatment liquid into another liquid and which overcomes the disadvantages of the prior art.

It is a further object of the instant invention to provide in a liquid treatment system a calibration and measuring system for automatically calibrating and controlling a pump.

It is a further object of the instant invention to provide in a liquid treatment system a stand alone calibration/measuring system for automatically controlling a pump in response to deviations in pump output.

It is still a further object of the instant invention to provide a calibration/measuring system for accurately determining the inventory of a liquid stored in a tank of a liquid treatment system.

It is still a further object of the invention to provide a calibration/measuring system for accurately determining the specific gravity of a liquid stored in a tank of a liquid treatment system.

It is yet a further object of this invention to provide a simple, yet effective, automated proportional feed system.

SUMMARY OF THE INVENTION

These and other objects of the instant invention are achieved by providing a calibration/measuring system for use in the liquid treatment system feeding a liquid into a line and utilizing a tank holding the liquid and having an outlet and a controllable pump coupled to the outlet for pumping the liquid from the tank into the line. The calibration/measuring system determines the volume of the liquid pumped each cycle of operation of the pump and comprises measuring means and control means. The measuring means comprises a hollow container coupled to the tank and in fluid communication therewith. The tank is coupled to the container so that liquid can be pumped therefrom. A first sensor is coupled to the container to provide a signal when the level of liquid in the container reaches a first position. A second sensor is also coupled to the container and provides a second signal when the level of liquid in the container reaches a second position, located below the first position. The container is calibrated to define a predetermined volume therein between the first and second positions. The control means establishes a predetermined number of cycles of operation of the pump to pump the predetermined volume from the container and for providing a third signal indicative thereof. The measuring means is responsive to the first and second signals for determining the actual number of cycles of operation of the pump required to pump the predetermined volume and for providing a fourth signal indicative thereof. The control means compares the third and fourth signals to provide an output signal responsive thereto. When control or calibration of the pump is desired the output signal is coupled to the pump to control its operation.

In accordance with another aspect of the invention, the container is filled with a liquid above the first position until the liquid level corresponds to the level of liquid in the tank. The calibration/measuring system then determines the number of cycles of operation of the pump necessary to cause the liquid in the container to drop from that level to the first position and to provide a fifth signal indicative of that number. That signal is utilized to provide an indication of the volume of liquid in the tank.

In accordance with yet another aspect of the invention, the calibration/measuring system comprises means for determining the specific gravity of the liquid in the tank.

DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 2, consisting of FIGS. 2A, 2B, 2C and 2D, is a functional block diagram of the calibration/measuring system shown in FIG. 1; and, FIG. 3 is an enlarged sectional view of a portion of the system shown in FIG. 1.

DESCRIPTION OF THE PREFERRED EMBODIMENT OF THE INVENTION

Figure 1:
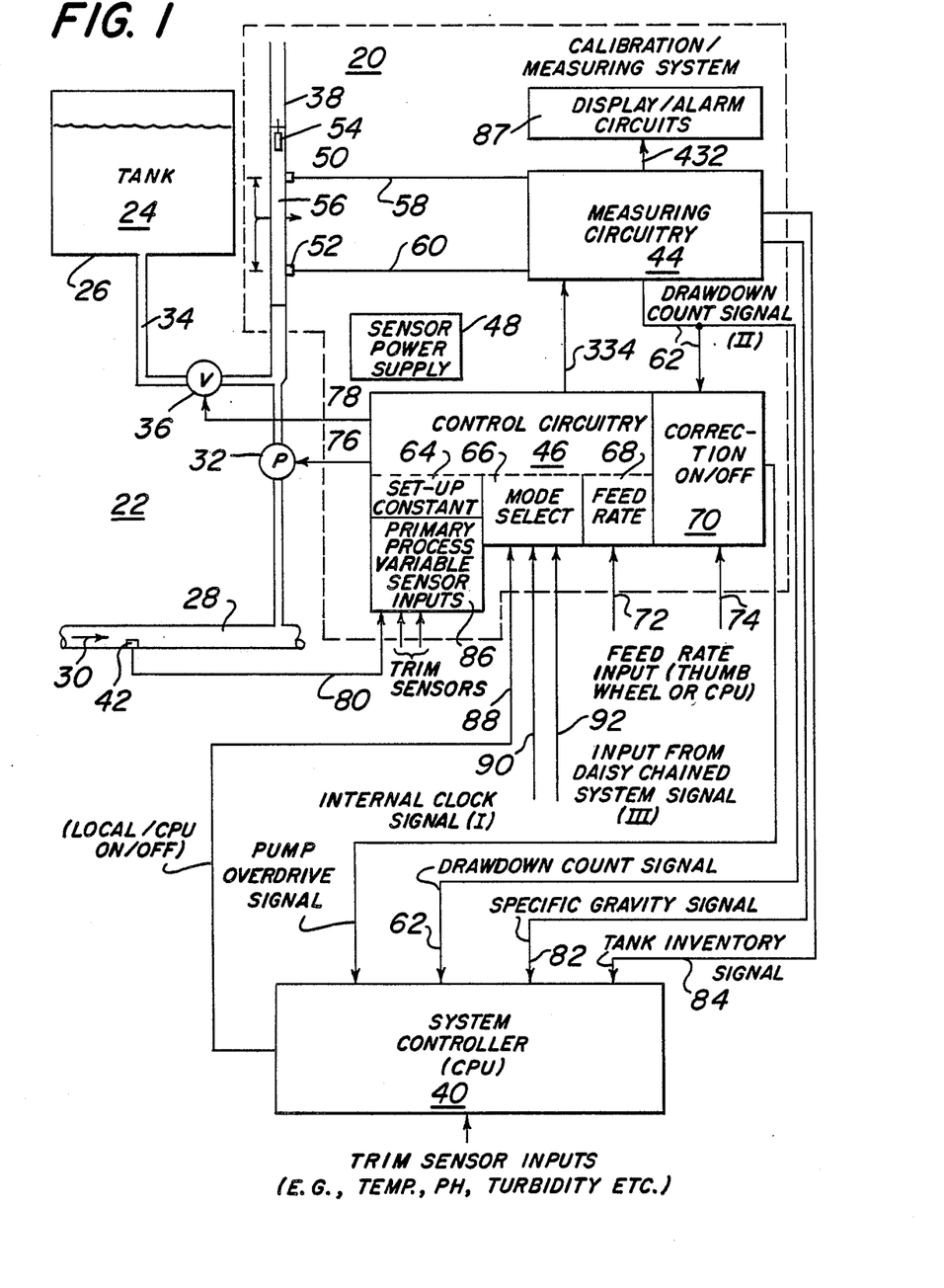
FIG. 1 is a schematic/functional block diagram showing the calibration/measuring system of this invention utilized in a conventional liquid treatment system.

Referring now to FIG. 1, there is shown at 20 a calibration/measuring system of the subject invention utilized in a liquid (e.g., water) treatment system 22. The liquid treatment system 22 in combination with the system 20 is arranged to effect the proportionate feeding of a treatment liquid 24 held in a storage tank or drum 26 into a line or conduit carrying the liquid 30 to be treated. The direction of flow of the liquid, e.g., water, through conduit 28 is shown by the arrow therein. The feeding of the treatment liquid 24 into the conduit is accomplished by the action of a controllable pump 32, such as a digitally pulsed pump. One particularly effective pump is sold by Liquid Metronics, Inc. as Model B. The inlet of the pump is connected in fluid communication to an outlet conduit 34 of the tank, via a controlable solenoid valve 36. A column 38 of known cross sectional area and volume is disposed adjacent to the tank. The column preferably is in the form of a sight glass, e.g., is transparent, so that the level of liquid therein is visible. The column 38 is connected in fluid communication with the outlet of the solenoid valve 36 and also the inlet of the pump 32. The upper end of the column is in communication with the top of the chemical storage tank 24 where there exists a saturated air space.

The conduit 28 can be of any particular diameter and is arranged to carry the liquid 30 therethrough to some location, for any desired purpose. The introduction of treatment liquid 24 into conduit 28 is effected by periodically opening the solenoid valve to allow the column 38 to fill with the treatment liquid and thereafter closing the valve and operating the pump to move the liquid into the conduit 28.

As can be seen, the liquid treatment system 22 also comprises a central (overall) system controller or CPU 40. This controller serves as the overall controller for system 22 and also controls the operation of the calibration/measuring system 20 when that system is in its CPU mode of operation. The calibration/measuring system 20 is also capable of operating in a manual or stand-alone mode.

As is conventional with proportional control liquid treatment systems a primary process variable sensor, such as a conventional paddle wheel flow meter, is provided. This device is located in the conduit 28 to provide an electrical signal indicative of the rate of flow of the liquid to be treated therethrough. The flow meter 42 is a conventional device, such as sold by Signet Scientific of El Monte, California under the model designation MK515-PO. Other "variable" sensors for monitoring system variables, e.g., ph, turbidity, temperature, conductivity, etc., can be utilized in lieu of, or in addition to, the flow meter 42.

As will be appreciated by those skilled in the art, the output of the pump 32, that is, the volume of liquid pumped per stroke or cycle thereof can vary over time. Accordingly, the calibration/measuring system 20 provides means for determining the pump's output and, if desired, controls the rate that the pump is operated (stroked) to maintain the desired volumetric output per unit of time. In addition, the calibration/measuring system 20 provides means for determining the volume of the liquid 24 in the tank, as well as means for determining the specific gravity of that liquid. Thus, the calibration/measuring system 22 basically comprises measuring circuitry 44, control circuitry 46, a power supply for the various system sensors 48, a pair of liquid level sensors 50 and 52, and a dark stem hydrometer 54.

The sensors cooperate with the measuring circuitry 44 to determine when a specific volume of treatment liquid has been pumped from the column 38 into the conduit in order to determine the number of pump strokes necessary to deliver that volume. That number or count is referred to as the "draw down" count and is used, when selected, by the control means to control or calibrate the pump. As can be seen in FIG. 1, the sensors 50 and 52 are located on or adjacent the sight glass portion of column 38, with the first or upper sensor 50 located above the second or lower sensor 52. The distance between the two sensors is predetermined so that the volume of treatment liquid within the portion 56 of the sight glass located between those two sensors constitutes a calibrated or predetermined volume, e.g., 100 milliliters. Each of the sensors 50 and 52 is of conventional construction, such as a Sight Glass Scanner, sold by NAMCO Controls, of Mentor, Ohio, under the model designation ES160-11956, and is arranged to provide an electrical output signal when the level of liquid (that is, the interface of the liquid surface and the air above it) reaches the position of the sensor.

The upper sensor 50 is connected, via an electrical conductor 58, to the measuring means 44, while the lower sensor 52 is connected, via an electrical conductor 60, to that means. Details of the measuring circuitry 44 will be described later, suffice for now to state that it includes counting means responsive to the signals on lines 58 and 60 to count the number of strokes it takes the pump to move the predetermined volume of liquid, into the line 28. The electrical signal from the measuring circuitry 44 indicative of that count is referred to as the "draw down count signal" and is provided from the measuring circuitry 44, via electrical conductor 62, to the control circuitry 46.

The control circuitry 46 controls the operation of the pump by providing driving pulses to it, with the frequency of those pulses being established by the control circuitry. In particular, the control circuitry is arranged when the system is in what is referred to as a "correction on" mode (to be described later) to automatically control the rate of pumping so that the pump delivers a predetermined volume of treatment liquid per unit of time, even if the volume of liquid delivered each stroke varies from a preestablished setting. The control circuitry 46 also establishes the desired feed rate of the pump, irrespective of whether or not the pump correction is desired, and is arranged to receive various manual or computer generated inputs, as well as the flow meter signal (which is indicative of the rate of flow of liquid 30 through the conduit 28).

The control circuitry 46 basically comprises, set-up constant circuitry 64, mode select circuitry 66, feed rate establishment circuitry 68, correction on/off circuitry 70, and primary process variable sensor input circuitry 86.

The feed rate circuitry will be described in detail later. Suffice for now to state that a desired feed rate for the pump is provided as an input thereto. This feed rate can be either a manual signal provided via a thumb wheel switch or other adjustable means forming a part of the calibration/measuring system 20, or by a signal received from some other controller, such as the CPU 40. In the system 22 shown, the feed rate constitutes the primary control of the pump. The signal establishing the feed rate is provided, via electrical line 72, to the feed rate circuitry 68 of the control circuitry 96, as will be described later.

The control circuitry 46 is also arranged to receive a manual input signal, via electrical line 74, to the correction on/off circuitry to establish the local stroke volume setting for the pump, that is, the volume of liquid to be delivered per stroke (cycle) of the pump. The control circuitry 46 operates in response to the setting of the feed rate to control the operation of the pump by providing pump driving pulses, via line 76, to the pump.

The pump's output is continuously monitored by the calibration/measuring system 20 so that it can maintain a desired output, when desired. To that end, when the system 20 is in the "correction on" mode, the control circuitry utilizes the draw down count signal appearing on line 62 and the local stroke volume signal appearing on line 74 to adjust the frequency at which the pump is pulsed to compensate for any discrepancy between the local stroke volume signal and the draw down count signal.

The system 20 determines whether the pump is out of calibration during each draw down operation, that is, during each cycle of operation of the system when the liquid 24 is pumped from the sight glass into the conduit 28. Each "draw down" cycle is initiated by providing a signal, via electrical line 78, from the control circuitry 46 to the solenoid valve 36. This signal opens the valve, whereupon the liquid 24 in the tank 26 flows through the valve into the sight glass 38 until the level therein reaches the upper sensor 50. When the liquid has reached that sensor the system 22 provides a signal to close the valve, whereupon the pump control signals are provided, via line 76, to drive the pump so that liquid is pumped from the sight glass into the conduit 28. When the liquid-air interface in the sight glass reaches the second or lower sensor 52, a signal is provided, via line 60, to the measuring means 46 to enable the measuring means to provide the heretofore identified draw down count signal on line 62. This draw down count signal is used, when selected by the control circuitry 46, to adjust the pulse rate of the pump, to thereby calibrate or adjust the pump to the desired output for the desired feed rate and the measured liquid flow rate through the conduit 28. The details of this operation will be described later.

After each tenth draw down cycle, a "tank inventory cycle" is initiated to determine the volume (inventory) of liquid in the tank 26. To that end, when the system is in the tank inventory cycle the control means keeps the solenoid valve 36 open until the level of liquid in the sight glass 38 has reached equilibrium, that is, reached the level of the liquid in tank 26. This is accomplished by establishing a fixed time delay after the liquid has reached the first sensor 50 before the solenoid valve is closed. The time delay is set sufficiently long, e.g., 1.5 minutes, so that the liquid in the sight class can reach equilibrium. After the liquid has reached equilibrium, the control means 46 provides a signal, via line 78, to the solenoid valve 36 to close that valve, while at the same time providing pump pulses, via line 76, to the pump, whereupon the pump starts pumping liquid out of the column 38. The measuring circuitry 44 also includes counter means (to be described later) which counts the number of strokes or pulses it takes the pump to reduce the liquid level from its equilibrium position, that is, the height corresponding to the height of liquid in the tank, to the level of the first sensor 50 and to provide an electrical signal, referred to hereinafter as the "tank inventory signal" indicative thereof. Tank capacity is constant.

The volumetric capacity of the column 38 per unit length, e.g., milliliters per inch, is known and stored in the calibration/measuring system 20. Moreover, the shape and orientation of the column is correlated to the shape of the tank 26 so that there is a known, e.g., linear, relationship between the height of liquid in the column and the volume of liquid 24 in the tank 26. For example, for a rectangular or vertically oriented cylindrical tank a vertically oriented, constant inside diameter, column 38 will provide the desired linear relationship. With the volume per unit length of the column known, the tank capacity count known, and with the information provided by the system 20 as to the deviation of the actual stroke volume from the preestablished local stroke volume, the system 20 is able to readily calculate the height of liquid in the tank. With that information and knowing the correlation between the shape and orientation of the column and the tank, the volume of liquid in the tank can be readily calculated. This action can be accomplished automatically by the calibration/measuring system 20 via means (not shown) therein, or a signal indicative of the height of the liquid in the column may be provided to the CPU 40. In that case, the volume of liquid in the tank may be calculated by the CPU or associated means (not shown). Alternatively, the signal indicative of the height of liquid in the tank can be provided by system 20 to some readout device (not shown) to enable the manual calculation of the volume of liquid in the tank. The means for effecting such calculations in either the system 22 or the system 20 will not be shown or described herein in the interest of brevity.

The calibration/measuring system 20 is also arranged, as noted earlier, to provide a signal indicative of the specific gravity of the liquid 24 in the tank 26. To that end, the heretofore identified hydrometer 54 is utilized. The details of that device and its operation with respect to the system 20 will be described later. Suffice to say that the hydrometer includes a conventional bulb from which a stem projects upward. The stem is dark so that it provides a contrasting appearance to the bulb. The hydrometer 54 is disposed within the sight glass so that it floats on the top surface of the liquid therein. The interface of the dark stem and the hydrometer bulb defines a detectable (e.g., visible) interface, which will be referred to hereinafter as the hydrometer interface. The hydrometer is constructed so that when it is floating on the surface of the liquid its detectable interface is spaced from the surface of the liquid by a distance corresponding to the specific gravity of the liquid. The hydrometer interface is arranged to be sensed by the upper sensor 50 to provide electrical signal to the measuring means 44 when the interface reaches that sensor (as the liquid column in the sight glass falls). The measuring means utilizes that signal, as well as a signal produced by sensor 50 when the air-liquid interface has reached it, to produce a count signal which is used to calculate the specific gravity of the liquid. Thus, to effect the specific gravity measuring process, the control means 46 provides a signal, via line 78, to the solenoid valve to open it and keep it open until the sight glass has filled to the equilibrium level. The pump is then pulsed, via line 76, to withdraw the liquid from the sight glass. This action causes the level of liquid therein to drop, whereupon when the liquid level reaches the point that the hydrometer interface is at the first sensor, a signal is provided by the first sensor, via line 58, to the measuring means 44. At this time, the measuring means begins to count the pulses (strokes) of the pump. When the air-liquid interface reaches the top sensor 50 another signal is provided thereby, via line 50, to the measuring means 44. This later signal causes the measuring means to stop the count. The resulting count is referred to hereinafter as the specific gravity count.

Inasmuch as the calibration/measuring system 20 has determined the volume of liquid provided by each stroke of the pump, and since the volume per unit length of the sight glass is known, the system 20 can readily calculate the distance between the liquid-air interface and the hydrometer interface from the specific gravity count, and from that calculation calculate the specific gravity of the liquid.

By providing a signal indicative of the specific gravity of the treatment liquid, the system can enable the precise proportioning of chemicals to be introduced into the conduit 28. For example, if for some reason the chemical liquid 24 within the tank becomes too weak so that its specific gravity decreases, the system 20 can detect this change to increase the pump output to thereby compensate for the diluted liquid. Accordingly, the system 20 can automatically and assuredly deliver a desired mass of chemical into the conduit irrespective of changes in the system 22.

As can be seen in FIG. 1, the measuring means 44 provides signals indicative of the draw down count, the tank inventory count and the specific gravity count, via electrical conductors 62, 82 and 84, respectively, to the CPU 40 so that the CPU can make use of these signals in performing its functions in the liquid treatment system 22.

As shown in FIG. 1, the calibration/measuring system 20 also includes display/alarm circuitry 87. This circuitry provides visual signal(s) indicative of system conditions, e.g, percentage deviation of the pump, and/or audible alarm(s) upon the occurrence of certain predetermined conditions, to be described later.

The proportional feed of the liquid 24 into conduit 28 to maintain the desired ratio of liquid 24 to liquid 30 irrespective of changes in the flow rate of liquid 30 through conduit 28 is accomplished as follows. The signal from the paddle wheel flow meter 42 or other input signal indicative of flow is provided, via line 80, and from the primary process variable input sensor circuitry 86, to the set-up constant circuitry 64 of the control means 46. That signal is utilized by the set-up constant circuitry, the associated mode select circuitry 66 and the feed rate circuitry 68 to control the pump output so that if the flow rate increases or decreases the pump output increases or decreases proportionately. This can be accomplished with or without pump calibration (i.e., adjustment to compensate for variations in stroke output). To that end, the correction on/off circuit 70 comes into play. Thus, if the correction on/off circuitry 70 is proportion to the change of flow in the conduit 28 as sensed by the paddle wheel flow meter, irrespective of any deviation in the output from the pre-established local stroke volume setting of the pump. If, however, control of the pump to effect calibration is required, the control means 46 provides output signals to the pump which not only compensate for changes in the flow rate in the line (as determined by the flow meter 42) but also compensate for changes in the pump stroke volume.

As can also be seen in FIG. 1, the control means 46 of system 22 is arranged to receive various trim sensor inputs, such as electrical signals indicative of temperature, ph, turbidity, etc. existing in the system. These signals are provided to the analog input section of the CPU and are processed to establish the feed rate when the system 22 is under the control of the CPU 40. To that end the CPU 40 provides a local/CPU (on/off) signal, via line 88, to the mode select circuitry 66 so that the control means 46 can respond to automated control from the CPU 40 or to local control, that is, manual settings of the calibration/measuring system 20. The mode select circuitry will be described in detail later. Suffice for now to state that it is also arranged to receive an internal clock system, via line 90, or an input from another similar (multiple) calibration/measuring system 20 (not shown) which is daisy chained to the system 20 shown in FIG. 1. The later signal is provided to the mode select circuitry 66, via line 92.

Figure 2A:
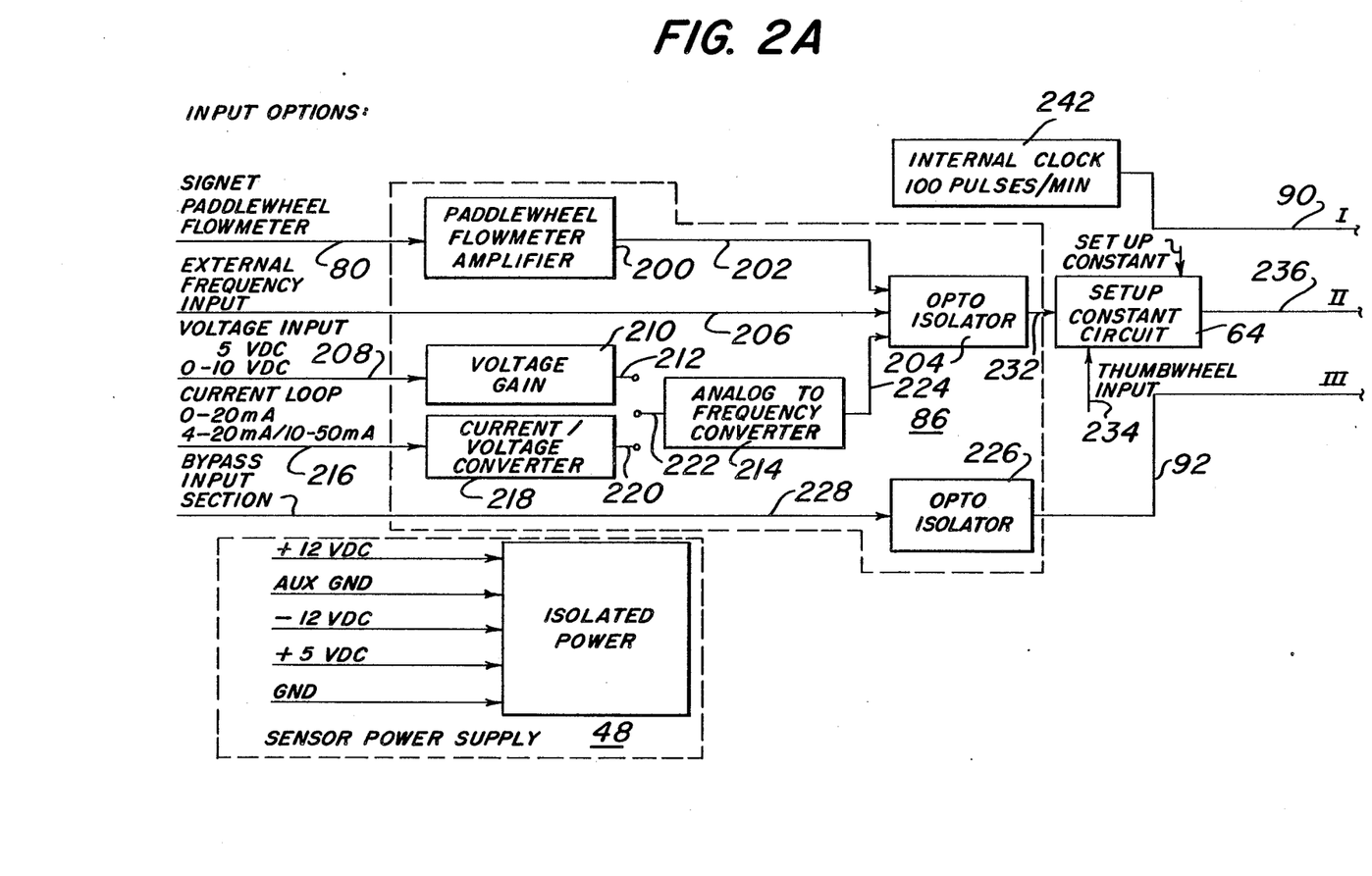

Referring now to FIG. 2A, the components forming the primary process variable sensor input circuitry 86 will be described. As can be seen therein, that circuitry 86 includes a paddle wheel flow meter amplifier 200 whose input is provided, via line 80, from the paddle wheel flow meter 42. The flow meter amplifier 200 basically consists of a comparator, such as a conventional LM311 comparator, sold by National Semiconductor. That device takes the sine wave input from the flow meter appearing on line 80 and converts it into a square wave output signal. In particular, the amplifier detects when the sine wave passes a threshhold valve, e.g., 1 volt, and each time it does so, the comparator switches back and forth to produce the square wave output. The frequency of the square wave is indicative of flow in ft/sec. The square wave output is provided, via output line 202, into one input of a conventional, quad-optoisolator 204, such as sold by NEC under the model designation PS2401-4. The optoisolator 204 serves to optically isolate each of the input signals to each of its sections from its respective output signals so that there is no crosstalk therebetween. To that end, each section of the optoisolator includes an LED input that is turned on and off by a digital signal appearing on its associated input line. Internally, the LED is coupled to a phototransistor to turn it on and off at a frequency of the operation of the LED to provide an output signal on its associated output line which follows the input.

As mentioned in passing earlier, the calibration/-measuring system 20 is arranged to receive other primary variable control input signals than that provided by the flow meter 42. To that end, the system 22, and in particular its circuitry 86, is arranged to receive an external frequency input signal, such as can be provided by the contact closure of a water meter. This signal is provided, via line 206, into another input of the optoisolator 204. The signal appearing on line 206 can also be a test frequency input signal generated by some test equipment (not shown) in order to test the system 22. Other process variable sensor inputs can also be utilized by the system 20. Among the more popular process inputs to circuitry 86 are voltage input signals from 0 to 5 volts DC or 0 to 10 volts DC and conventional current loop signals in the range of 0-20 milliamps, 4-20 milliamps, or 10-50 milliamps.

Power for all of the input sensors associated with the primary process variable sensor input circuitry 86 is provided by the power supply 48. That supply basically consists of an isolated power supply component 230, whose various outputs are plus and minus 12 volts DC, plus 5 volts DC and ground. By providing the isolated power supply 230, any failure, e.g., short, of an input (trim) sensor, will not affect the internal circuitry of the system 22 itself.

The voltage input signals are provided, via line 208, to a voltage gain circuit 210 of circuitry 86. Circuit 210 acts as a buffer and consists of conventional, operational amplifier voltage followers. The amplified, buffered analog output signal from the voltage gain circuit 210 is provided onto output line 212. This line is arranged to be bridged by a jumper (not shown) to an analog-to-frequency converter circuit 214 (to be described later). The current loop primary process input signals are provided as an input on line 216 to a current/voltage converter circuit 218 forming a portion of the circuitry 86. The converter 218 also includes means to remove any offset that may have been provided in the current loop signals, e.g., 4-20 milliamps or 10-50 milliamps, so that all input signals are full scale signal. The converter is a conventional instrumentation amplifier, such as model AMP-01 made by Precision Monolithics, Inc., Santa Clara, Calif. The analog voltage output from the converter 218 is provided onto output line 220. That line is also arranged to be connected via the jumper as an input to the analog-to-frequency converter circuit 214. Thus, the input to that circuit is provided via line 222 or line 220, as the case may be, so that the analog signal indicative of either of the voltage input or the current loop input is provided to the analog-to-frequency converter 214. The converter 214 basically comprises a conventional device such as a model VFC100 voltage-to-frequency converter sold by Burr-Brown of Tucson, Arizona and is arranged so that for an input of 0 to 10 volts it provides a linear output frequency of from 0 to 1.666 KHZ, with the frequency at the output line 224 being a function of the analog voltage signal appearing at its input. The output frequency signals of the circuit 214 are provided, via line 224, to the third input of the optoisolator 204. Thus, the optoisolator 204 either receives clock pulses which are indicative of the rate of flow of liquid through the conduit 28 (as determined by the flow meter), external frequency inputs (such as provided by the contact closure off a water meter or some other input), or conventional voltage or current inputs (provided from other measuring or control devices). The primary process variable sensor input circuitry 86 also includes another optoisolator 226, which is a portion of the quad-optoisolator 204 and which receives a signal, via line 228, from a bypass input section (another system 20 daisy chained to the system 20 shown herein).

The signal appearing at the output of the optoisolator 204 is provided, via line 232, to the input of the set-up constant circuitry 64. The function of that circuit is to take the high frequency input and scale it down. Thus, the circuitry 64 basically comprises a frequency prescaler in the form of a simple divide-by-N circuit. In particular, the prescaler divides the 0 to 1.666 KHZ output frequency of the circuit 86 by any number from 3 to 999. The prescale factor is provided, via an input signal, appearing on line 234 from an adjustable BCD encoded rotary switch (not shown) or any other adjustable input device. The set-up number "N" which is used to divide the frequency appearing at input line 232 is selected as a function of the diameter of the conduit 28, the material making up the conduit, the full scale load for the system, as well as any other relevant input factors. Thus, one can configure the system 20 to provide a maximum pump output at a certain flow volume per time (GPM) through the particular conduit 28.

Figure 2B:
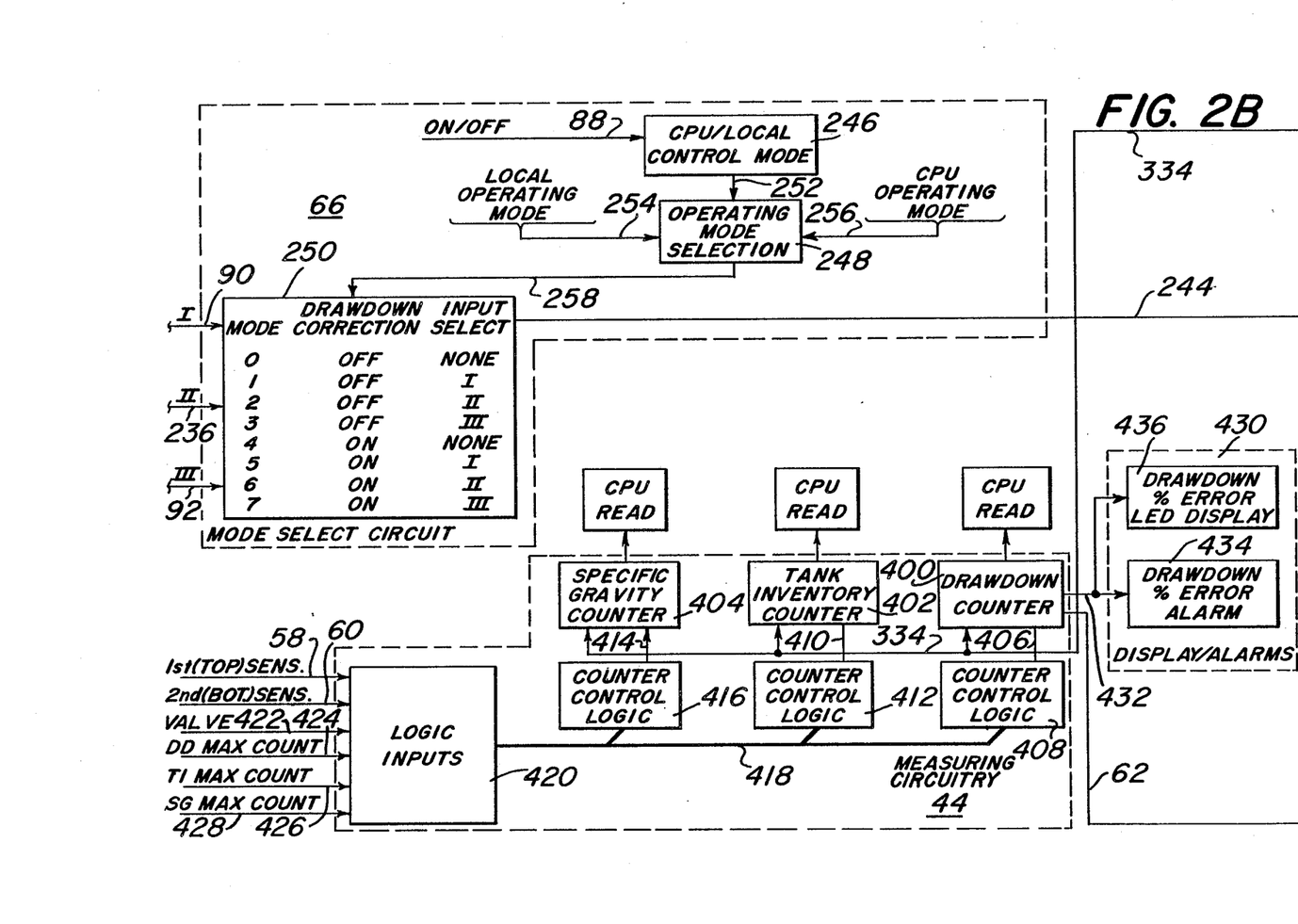

The prescaled frequency from the set-up constant circuit 66 is provided as an output signal, II, via line 236 to the mode select circuitry 66 (FIG. 2B of the control means 46). That circuitry also includes two other inputs, namely, the output signal, III, appearing on line 92 from the optoisolator 226, and a fixed clock frequency signal, I, e.g., 100 pulses per minute provided, via line 90, from an internal clock generator circuit 242. That latter circuit is provided so that if the user of system 20 elects not to utilize any input sensors, the system could, based on the signal appearing on line 90, deliver a predetermined volume per time of liquid from the tank into the system to be treated.

The mode select circuitry 66 is arranged to select either the input signal I (to provide volume per unit time liquid application), or signal II (to proportion the liquid as a function of the primary process variables), or the signal III (to allow the user to cascade or daisy chain the output of another duplicate system 20). The daisy chained control is utilized when feeding plural different liquids into the conduit 28, with the ratio of the liquids to one another being predetermined, but all a function of the primary control input, e.g., all tracking the same flow rate.

To achieve the foregoing and as seen clearly in FIG. 2B, the mode select circuitry 66 establishes one of seven modes of operation. Those modes are identified functionally in the block diagram as modes 0, 1, 2, 3, 4, 5, 6 and 7. In mode 1, the input signal I appearing on line 90 is selected to appear at the output line 244 of the mode select circuitry. In addition, and during mode 1 operation, the draw down correction circuitry 70 is "off" so that while a draw down count is determined, it is not used to calibrate or control the pump. Thus, in mode 1 operation, the pulsing of the pump does not change to compensate for changes in stroke volume of the pump. In mode 2 operation, the frequency signal II appearing on line 236 is provided at the output line 244, again with the draw down correction being "off". So, too, in mode 3, the frequency signal III appearing on line 230 is provided at the output line 224 again with the draw down correction circuitry "off". When the system 22 is in modes 5, 6 or 7, the frequency signals I, II or III, appearing on lines 90, 236 and 92, respectively, are provided at the output line 244 of the mode select circuitry, but the draw down correction circuitry is "on". Thus, in these modes of operation the pump is controlled as a function of the draw down count, to thereby compensate for deviations in pump stroke output from desired values. In mode 0, none of the inputs are selected, and there is no draw down correction, while in mode 4 none of the inputs are selected (although there is draw down correction). Modes 0 and 4 are useful for system troubleshooting and automated self-diagnostics.

The mode select circuitry 66 is preferably implemented utilizing digital logic, e.g., a programmable logic array and associated integrated circuit chips. In particular, circuitry 66 basically comprises the components shown by the functional blocks 244, 248 and 250. The selection of which frequency signal appearing on the three input lines to the mode select circuitry is passed to the output line 244 thereof and is determined by the input signal appearing on control line 88 from the CPU 40. Thus, line 88 is connected as an input to the CPU/local control mode circuit 246. The signal appearing on line 88 comprises a signal indicating whether the system 22 is to operate under computer control from the CPU 40 or under local (manual) control. In manual control, control is established by various manual inputs to the system 22, e.g., the various thumb wheel inputs. In a preferred embodiment of the invention, the local control mode is established as a fallback or fail-safe mode of operation and occurs in the event of a failure of the CPU 40 or if the CPU relinquishes control. Local control can also be used at any time CPU control is not desired.

The CPU/local control mode circuit 246 provides an output signal indicative of the desired mode of operation, namely, whether CPU or local control. This signal is provided, via line 252, to the input of the operating mode selection circuit 248. That circuit basically comprises a multiplexer having a pair of input lines 254 and 256. Input line 254 carries a signal establishing a local operating mode, whereas line 256 carries a signal establishing a CPU operating mode. These signals are produced by means making up the mode control circuitry 66. In particular, the signals are created utilizing Binary Coded Decimal (BCD) switches and associated buffers. The two signals establishing the two modes are provided as inputs to the operating mode selector or multiplexer 248. Depending on the input signal appearing on line 252, the multiplexer 248 either provides the local operating mode signal or the CPU operating mode signal at its output line 258. This signal is utilized by the programmable array 250 of the mode select circuitry 66 to establish the desired mode of operation.

It should be pointed out at this juncture, that when the system is operating in the local mode, it can be overridden by the CPU operating mode so that control is effected pursuant to instructions from the CPU 40. Moreover, control of the CPU 40 itself can be effected from some other means, e.g., a remote or host computer (not shown). In any event, the system 20 is constructed so that if there is a problem in the CPU 40 and/or its associated circuitry, or if the CPU should go off line, the system 22 automatically falls back to operation in the local (manual) operating mode.

Figure 2C:
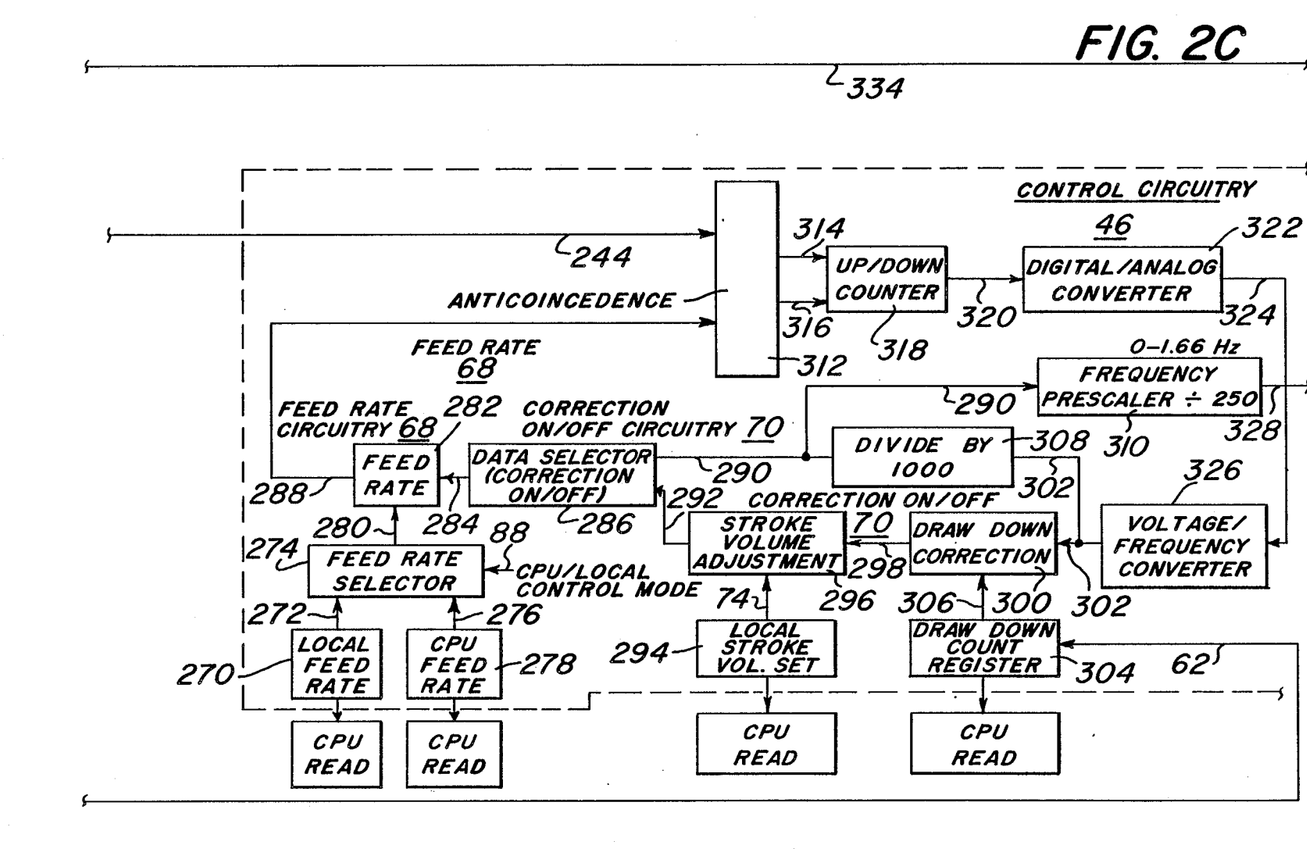

Referring now to FIGS. 2C, the details of the feed rate circuitry 68 will now be described. As can be seen, the feed rate circuitry 68 basically comprises a local feed rate input means 270. This means establishes the feed rate and preferably comprises a thumb wheel switch (not shown) which is set to the desired local feed rate of the pump. The signal from means 270 is provided, via output line 272, as one input to a feed rate selector 274. That selector basically comprises an 8-bit multiplexer arranged to receive two 8-bit inputs. Those inputs are provided, via either lines 272, from the local feed rate means 270, or via lines 276, from CPU feed rate means 278. Means 278 receives an 8-bit signal from the CPU 40 defining the desired CPU feed rate. A signal indicative of the local feed rate, as established by means 270, is provided back to the CPU 40. The actual selection of the particular feed rate to be provided by the feed rate circuitry 68 is established by the control signal appearing on the control line of the multiplexer 274. Thus, the control input of the feed rate selector is provided, via line 88, carrying the local/CPU (off/on) signal. In particular, when the system is in the local mode, the feed rate established by means 270 is provided via output line 280 to the control input to the feed rate circuit 282. That circuit basically comprises a divide-by-N circuit, with the "N" being established by the signal appearing on control line 280. The input to the divide-by-N circuit 282 is provided via line 284, with the signal appearing thereon consisting of a string of clock pulses provided at the output of a correction on/off (data selector) circuit 286. That circuit basically consists of a multiplexer and is arranged to receive clock pulse signals which have as their genesis the clock pulse signals appearing at the output line 244 of the mode select circuit 66 (as will be described later). The control signal appearing on line 280 basically comprises two, four-bit words combined into an 8-bit digital signal. One of the words is a Binary Coded Decimal (BCD) of the "units" digit and the other word is a Binary Coded Decimal of the "tens" digit. Therefore, the combined 8-bit digital signal on line 280 defines a feed rate from 0 to 99%. The clock pulses appearing on input line 284 are at a frequency which may or may not be adjusted, depending upon whether the calibration correction circuitry is "on" or "off". In any event, the feed rate circuitry divides the frequency of the clock pulses appearing on line 284 by the integer defined by the signal appearing on line 280. Thus, for example, if a feed rate of 88% is required, the "88" signal appearing on control line 280 causes the divide-by-N circuit 282 to divide the input pulse train appearing on line 284 by 88, whereupon for each 88 input pulses appearing on line 284 the output of the feed rate circuit, as provided on output line 288, is a single pulse. The feed rate can thus be thought of as the "set point" of the control system of this invention.

The correction on/off circuit 70 is operative to effect the pulsing of the pump in an uncalibrated state at whatever particular set point is established or to effect the calibrated control of the pump to achieve that set point value by taking into account any deviation between the pump stroke volume and the local pre-established stroke volume. In particular, if the system is operating correction "on" the circuitry 70 looks at the percent stroke volume at which the pump has been set to operate. By percent stroke volume, it is meant how much of a given volume the pump provides each stroke. The percent stroke volume is established by the local stroke volume setting means 294. That means, like means 270, preferably comprise a manually adjustable thumb wheel switch (not shown) or other adjustable device which provides a digital signal on line 74. The signal establishes the percent stroke volume for 30% to 100%. This stroke volume signal is also provided to the CPU 40 so that it can make use of that information, as required. The signal appearing on line 74, that is, the percentage stroke volume, is provided to a stroke volume adjustment circuit 296. That circuit is another divide-by-N circuit. Circuit 296 includes an input line 298, with the signal appearing on the input line comprising a stream of pulses at a controlled frequency and which is provided from a draw down correction circuit 300 (to be described later). The percentage stroke volume signal appearing on line 74 establishes the denominator (the "N") for the circuit 296, whereupon the frequency of the pulses appearing on line 298 is divided by the percentage stroke volume to produce an output pulse train of a lower frequency on line 292.

The draw down correction circuit 300 comprises yet another divide-by-N circuit which is provided with a pulse train input. The frequency of that input is controlled by other portions of the control means 46. In particular, the pulse train input to the draw down correction circuit 300 is provided via line 302. The draw down correction circuit 300 divides the pulse train input by the value of the signal appearing on control line 306. That signal is the draw down signal and is provided, via line 62, to a draw down register 304. The register stores the draw down count and makes it available, via line 306, to the draw down correction circuit 300. Thus, the signal appearing on line 306 establishes the "N" of circuit 300 so that the frequency of the pulse train appearing on line 302 is divided by the draw down count.

As will thus be appreciated, with the draw down count correction circuitry 70 "on", the clock pulse train provided on line 302 is first divided by the drawn down count in the draw down correction circuit 300 and then divided by the local stroke volume setting in the stroke volume adjustment circuit 296. The divided frequency output signal is then provided, via line 292, to the correction on/off circuitry data selector 286. The data selector passes the divided signal, via line 284, to the feed rate divide-by-N circuit 282.

When the system 22 is operating with draw down correction "off" the pulses appearing on line 302 are provided to a divide-by-1000 circuit 308. The output of the divide-by-1000 circuit is provided, via line 290, to the second input of the multiplexer 286 and to a frequency prescaler circuit 310. The function of the divide-by-1000 circuit is to provide good resolution and speed of response for the system, while also enabling the changing of stroke volume by decades. The frequency prescaler 310 basically comprises a divide-by-250 circuit which serves to scale the clock pulses appearing on input line 290 down to a frequency range which can be utilized to drive the pump 32. In this connection, it should be remembered that the frequency of the pulse train signals appearing on line 302 from the voltage to frequency converter are in the range of 0 to 500 KHz. These signals, as will be described later, are provided to the divide-by-1000 circuit 308 so that its output appearing on line 290 are at a frequency in the range of 0 to 500 Hz. The frequency prescaler 310 further divides those signals down to a frequency in the range of 0 to 2 Hz to accord with the pump's range of operation of 0 to 120 pulses per minute.

The output signals appearing on line 328 of the prescaler are conditioned by duty cycle establishing circuitry, to be described later, in the control means 46 to drive the pump at the desired frequency and with pulses of the appropriate duty cycle.

The high frequency clock pulses appearing on line 302 are provided by the control means 44 in response to the receipt of the high frequency clock pulses appearing on output line 244 of the mode select circuitry. Those clock pulses are at a frequency which is utilized to synthesize or generate a second frequency which is close to or coincident therewith. Thus, as can be seen in FIG. 2C, the control means 46 includes anti-coincidence detection circuitry 312. That circuitry includes two inputs, namely, the process variable input signal appearing on line 244 from the mode select circuitry 66 and an internally synthesized signal appearing on line 288 from the output of the feed rate circuitry 68. These two signals are to be used by an up/down counter 318. Since that counter cannot count up and down simultaneously the anti-coincidence circuitry is arranged to monitor the signals on lines 244 and 288 to determine when they are coincident with each other. The circuit 312 basically comprises a 250 KHz, 2-phase clock made up of plural flip-flops and various small scale integrated circuits. These components are arranged to take the two input frequencies and shift them slightly in time so that no input pulse is missed. The signals from the circuitry 312 are provided, via lines 314 and 316, to the up/down counter circuit 318. That circuit basically comprises two conventional counters, such as models 74HC193 sold by National Semiconductor Corporation. As long as the two input frequencies appearing on line 244 and 68 are relatively equal, the count in the up/down counter remains relatively constant. The output of the counter is in the form of an 8-bit count of from 0 to 255 and is provided, via line 320, to a digital-to-analog converter 322. That converter is a conventional device, such as model DAC0800, sold by National Semiconductor Corp. and takes the 8-bit input signal and converts it into an analog voltage of from 0 to 10 VDC. The analog output of the digital-to-analog converter 322 is provided, via line 324, to the input of a voltage-to-frequency converter 326. That circuit is constructed similarly to the analog-to-frequency converter 214 and converts the analog signal into a frequency of 0 to 500 KHz which is provided on line 302.

Collectively, the up/down counter 318, the digital-to-analog converter 322 and the voltage-to-frequency converter 326 can be thought of as a count-frequency synthesizer. The count-frequency synthesizer circuitry and its associated components form what could be termed a "pump pulse synthesis" circuit. That circuit is a frequency-lock loop which automatically adjusts itself to make the frequencies of the two input signals on lines 244 and 288, respectively, equal. Operation of the pump pulse synthesis circuit is as follows: Assuming that the closed loop control system is "balanced" (i.e., for a given process flow, the pump is being stroked at the appropriate frequency). If the flow rate through the conduit 28 increases, the up/down counter 318 begins to count up. This causes a higher frequency to be provided on lines 302, 290, 292, 284 and eventually 288. As long as the frequency of the signal on line 288 is not equal to the frequency of the signal on line 244 the counter 318 continues to count up. When the loop becomes balanced and the frequencies on the lines 244 and 288 become equal the pump will now be stroking at a higher frequency as is appropriate considering the increased flow. When the system is balanced and the feed rate is decreased, e.g., changed from 80 to 40, the frequency of the pulses on line 288 doubles (the feed rate is now divided by 40 instead of 80). Thus, the up/down counter 318 counts down. This causes a lower frequency to appear at lines 302, 290, 292, 284 and eventually 288. When the loop again becomes balanced, the frequency of the signals on line 302 will be half of what it originally was and the pump will be stroking at half the original frequency.

Figure 2D:
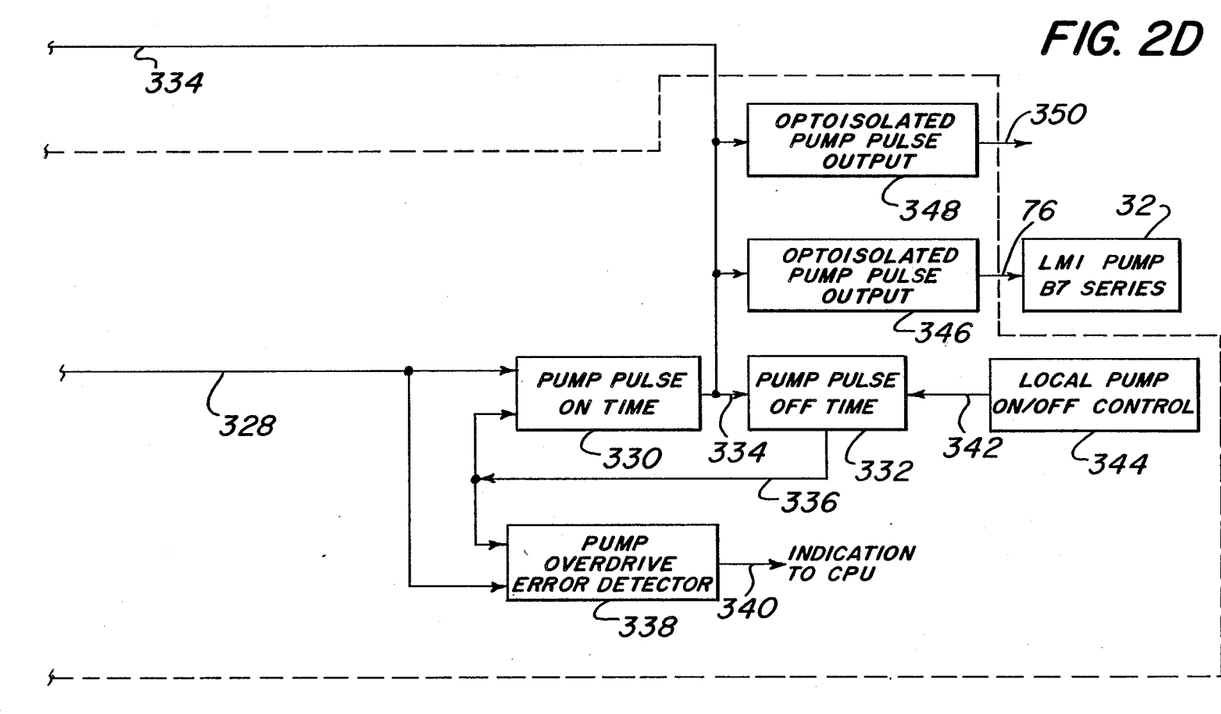

In order to drive the pump properly, as mentioned earlier, the control means 46 includes circuitry to condition or establish the duty cycle of the pulses provided to the pump. In a system utilizing an LMI, B7 series, pump such as is used in a preferred embodiment of this invention, the input requirements to the pump are a pulse of a minimum of 50 milliseconds duration (on time), with a time between pulses (off time) of a minimum of 100 milliseconds. Thus, as shown in FIG. 2D, the control means 46 includes a pump pulse on time circuit 330 and a pump pulse off time circuit 332. The pulse on time circuit receives one input from line 328 from the frequency prescaler 310. The output of the pump pulse on time circuit is provided, via line 334, to the input of the pump pulse off time circuit 332. Both circuits are conventional digital circuits which cooperate to create a pulse of particular duty cycle, and are preferably made up of a series of flip-flops and small integrated circuits.

The output of the pump pulse off time circuit 332 is provided via line 336, back as a second input to the pump pulse on time circuit 330. The line 336 also serves as one input to a pump overdrive error detector circuit 338. That circuit includes a second input provided via line 328 from the frequency prescaler 310. The pump overdrive detector basically comprises a single flip-flop and small integrated circuits, whose output is provided via line 340 to the CPU 40. A second input to the pump pulse off time circuit 332 is provided, via line 342, from a local pump on/off control circuit 344. That circuit basically comprises small integrated circuits to allow manual input to enable or disable pump stroking. The pump pulse on time circuit serves to ensure that the pulse provided, via line 328, remains on for a predetermined period of time, whereas the pump pulse off time circuit 332 ensures that the time between pulses is at a predetermined minimum value. These two circuits are coupled back together in a feedback loop. Thus, the pulses appearing on line 334 are conditioned to be of the desire duty cycle for the pump. These pulses are also provided, via line 334, to first and second optoisolated pump pulse output circuits 346 and 348, respectively. The optoisolators 346 and 348 form respective portions of a quad optoisolator like that described earlier. Thus, optoisolator 346 takes the input signal appearing on line 334 to provide a signal at its output line 76 which follows the input, but is isolated therefrom. This signal is provided by line 76 to drive the pump 32. The second optoisolated pump pulse output circuit 348 provides output signals which also echo the pulses at the pump. These signals are provided via line 350 to provide a visual indication of the pump strokes to the operator. These signals are also provided to a CPU counter (not shown) for the purpose of counting pump pulses per minute and calculating the volume pumped in gallons per minute.

The pump overdrive detector circuit 360 basically comprises a flip-flop and small integrated circuits. The function of the overdrive detector circuit is to determine if the system is attempting to drive the pump in excess of its capabilities and to provide a signal to the CPU 40 upon the occurrence of such condition. In particular, the signal appearing on line 340 which indicates an overdrive condition is provided to set a bit in a status register (not shown) in the CPU 40. The CPU can then take appropriate action, e.g., back down on the feed rate to bring the pump back into its operating range. The signal appearing on line 340 is also used to provide an indicator to operating personnel of the overdrive (alarm) condition.

The local pump on/off control circuit 344 basically comprises an arrangement of small integrated circuits. Its function is to disable the pump, when desired, by providing an appropriate signal on line 342 to the pump pulse off time circuit 332. Thus, the circuit 344 serves as an interlock for the pump.

As can be seen in FIGS. 2B, 2C and 2D, line 334 is connected to the measuring circuitry 44. Thus, line 334 carries pulses which echo (indicate) the stroking of the pump so that the measuring circuitry can utilize this information in effecting its various operations.

As can be seen in FIG. 2B, the measuring means 44 includes plural counters which receive counts indicative of the draw down, tank inventory and specific gravity of liquid in the tank, as determined by the system 20. In particular, there are three counters, namely, draw down counter 400, tank inventory 402 and a specific gravity counter 404. Each of the counters includes one input connected to line 334 carrying pulses echoing the operation of the pump. Each of the counters also includes a second input coupled to appropriate counter control logic circuitry. Thus, draw down counter 400 includes a line 406 coupled to the output of a counter control logic circuit 408. The tank inventory counter 402 includes an input line 410 connected to the output of the counter control logic circuit 412. The specific gravity counter 404 includes an input line 414 connected to the output of the counter control logic 416. All of the control logic circuits 408, 412 and 416 are connected to a common bus 418. The bus 418 is itself connected to the output of a logic input circuit 420. That circuit is an optoisolated buffer such as sold by NEC Electronics, Inc. (NEC) under the model designation PS2401-4, and has six inputs. Those inputs are the top sensor input line 58, the bottom sensor input line 60, a line 22 connected to the valve 34 and arranged to provide a status signal indicating whether the valve is open or closed, a line 424 which provides a signal indicative of the draw down maximum count, a line 426 which provides a signal indicative of the tank inventory maximum count, and a line 428 which provides a signal indicative of the specific gravity maximum count. Each of the control logic circuits 408, 412 and 416 basically comprises synchronous sampling registers Programmable Logic Arrays and flip-flops. The circuits 408, 412 and 416 serve to control their associated counters, e.g., reset the counter on power-up, start the counter, stop the counter, etc. Once a counter stops counting, its count is transferred into an associated storage register (not shown) and the counter is cleared so that it is ready to start counting again.

The output of the draw down counter is provided, via line 62, to the correction on/off circuitry 70. In addition, the draw down count is also provided to display and alarm circuitry 87, via line 432. That circuitry as noted earlier provides indications of system conditions and any alarm status. Thus, line 432 serves as one input to the draw down percent error alarm circuit 434 and as an input to a draw down percent error LED display circuit 436. The LED display circuit consists of a series of colored LEDs that are mounted on a panel of system 20 and arranged as a "null" meter. The middle of the display is established to be 0% error, while the colored LEDs above and below indicate plus and minus error in the draw down. As will be appreciated by those skilled in the art, when the display displays a plus percent error that indicates that the pump is pumping more than what is expected and its pulse rate has to be slowed down. Conversely, a minus percent error means the pump is pumping less than expected and has to be speeded up if precise calibration is desired. It should be remembered that the system need not control the pump to calibrate it upon a deviation from a desired stroke setting. In such a case, while the display circuit 436 will display the deviation, the system 20 will not take action to correct or compensate for the deviation.

The draw down percent error alarm circuit 434 provides an alarm signal which can be sent remotely to a control room or to some other site to provide a signal any time that the draw down error is outside of a predetermined range (window), e.g., plus or minus 15% error in draw down provides an alarm. In the preferred embodiment of this invention, there are four alarm bands or ranges for actuating the draw down percentage alarm. Thus, the alarm circuit 434 includes four jumper selectable connections (not shown) to establish alarm bands at plus or minus 15%, plus or minus 20%, plus or minus 25% or plus or minus 30%.

The inputs appearing on lines 424, 426 and 428 to the logic circuit 420 are provided by the counters 400, 402 and 404, respectively. These counters are sized so that none should reach its maximum count before it is cleared. Thus, the signals appearing on lines 424, 426 and 428 indicate if a count has reached the maximum before being cleared and which would indicate some error. These signals are provided, via the bus 418, to the counter control logic circuits associated with the respective counters to control their operation.

Figure 3:
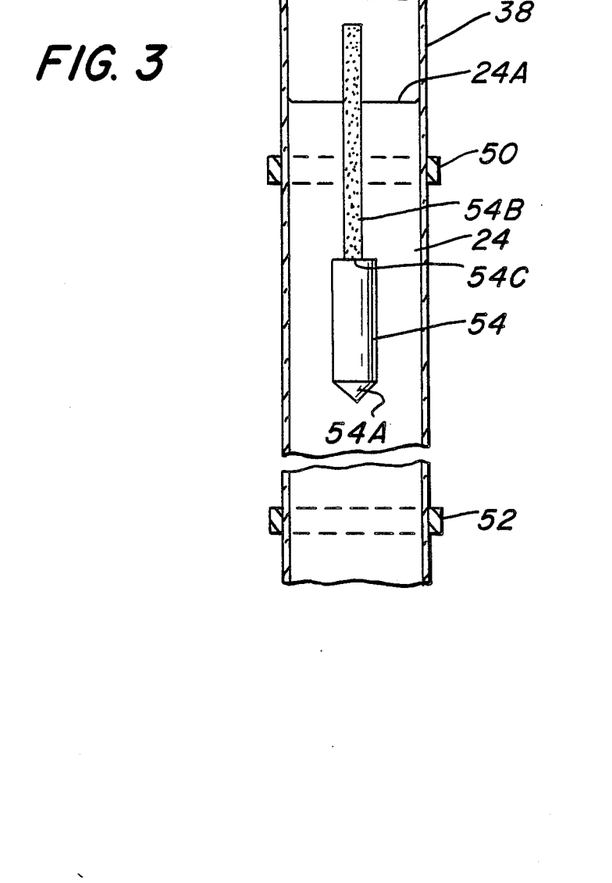

Referring now to FIG. 3, more of the details of the hydrometer 54 and the associated portions of the sight glass 38 and sensors 50 and 52 will be described. Thus, as can be seen, the hydrometer 54 is of a somewhat conventional nature and includes a bulb portion 54A and a dark stem upper portion 54B. The interface between the stem 54B and the bulb 54A creates a visually perceptible or detectable interface 54C. The hyrdometer is constructed so that when it is disposed within a liquid, such as liquid 24, it floats therein, with the distance between its interface 54C and the surface of the liquid, that is, the air-liquid interface 24A, being a function of the specific gravity of the liquid 24.

As will be appreciated by those skilled in the art, the subject calibration/measurement system is emminently suitable as a proportional controller for a chemical pump and has application in nearly all types of chemical feed, for mill water, polymer feed, boiler chemicals, cooling chemicals, process chemicals and even production of chemicals. The system offers significant advantages over prior art systems in that it checks chemical delivery and automatically corrects for any discrepancy between the feed rates set and the actual delivery when operating in the correction "on" mode. Moreover, the system is a true proportional controller of wide utility in that it can effect ratio control by taking a variety of input signals to accommodate a variety of conventional meters, such as paddle wheel pulse meters, contact closure, 0 to 5 volts, 4-20 milliamps, etc. In its most common mode, as described herein, the system is used to pump a liquid chemical into a conduit carrying water. Thus, the ratio control is provided based on water flow rate. However, the system can ratio to time, or to virtually any other instrument control. Thus, the system pulses the pump for each stroke. The pulses are in proportion to the set point of the water meter rate. By making a direct conversion to pulses to drive the pump instead of outputting an analog signal, e.g., 4-20 milliamps, the system can use a less expensive pump and change proportional feed rates immediately without any stoppage for a sampling period. As also described above, the system automatically effects pump verification, and if desired, pump calibration (compensation) with such calibration being capable of being accomplished continuously. Pump malfunction can be detected within a short period of time, e.g., two minutes of failure.

To accomplish the foregoing, the system draws the treatment liquid from a sight glass or calibrated cylinder to count the number of strokes needed to evacuate a known volume of chemical therefrom. The volume divided by the number of strokes equals the volume of each stroke. If the desired stroke volume is determined to be low, the pump pulse rate is increased proportionately. The result is delivery of the exact amount of treatment liquid required. If the pump is unable to make up the deficiency, e.g., the tank has no chemicals in it, the system will provide an alarm. The calibrated cylinder, that is, the portion of the sight glass between the upper and lower sensors can be of a fixed height (volumetric capacity) or can be adjustable so that in the latter case it can be readily tailored during manufacturing for use in a specific treatment system 20.

The system 20 also provides automatic tank inventory. To that end, during periodic cycles of operation the system allows the liquid in the sight glass to rise to reach its own level, that is, the level of liquid in the tank. The system then counts the number of pulses needed to draw the liquid down to the top sensor on the sight glass and then count the pulses to reach a second sensor to determine the volume for each pulse. This provides a measure of liquid depth in the tank to the nearest pulse, which measure can be utilized to convert to tank inventory.

Specific gravity of the liquid in the tank is readily determined by the system 20 by the use of a dark stem hydrometer floating on the surface of the liquid in the sight glass, or through some other means, to provide a count indicative of the distance separating the surface of the liquid in the sight glass from a reference point, e.g., the detectable interface of the dark stem hydrometer. From this distance, the system can readily calculate the specific gravity of the liquid in the tank. With the specific gravity known, the system can effect control of the pump to change its output in the event that the concentration of the chemical in the tank varies from a desired quantity, to thus provide desired mass of chemical into the liquid being treated. Other specific gravity detecting means can be used in lieu of the dark stem hydrometer, e.g., a column or second sight glass having a known (reference) liquid therein whose height is sensed by an associated sensor with the liquids in the two columns being separated by a moveable diaphragm or an immiscible interface.

As a result of the foregoing, the subject invention achieves precise feed rate, proportional to flow, acquires confirmation of exact delivery and receives accurate inventory information. All of these features are achieved without the use of any computer in system 20. By adding a very simple computer to the treatment system, e.g., use of a computer like CPU 40 in the system 22, all of the data produced by the calibration/measuring system 20 of this invention can be provided to it for storage and/or remotely communication. With the use of a computer in the system 22, complex control algorithms (based on temperature, corrosion rates, etc.) can be used to set the feed rate; or the feed rate can be manually or automatically changed, e.g., via telephone modem. The new rate will thus override the rate set by the measurement/calibration system 20. In the event of a failure, the system 20 simply operates at the rate set manually thereby.

Without further elaboration the foregoing will so fully illustrate my invention that others may, by applying current or future knowledge, adopt the same for use under various conditions of service.

What is claimed as the invention is:

1. In a treatment system for pumping a liquid into receiving means, said treatment system comprising tank means holding said liquid and having an outlet and controllable pump means having an inlet for cyclically pumping said liquid into said line receiving means, the improvement comprising a calibration/measuring system for determining the volume of said liquid pumped each cycle of operation by said pump means and for controlling the operation of said pump means in response thereto, said calibration/measuring system comprising first and second sensor means, hollow container means connected to the outlet of said tank means and in fluid communication therewith for receiving said liquid from said tank means, measuring means, and control means, said hollow container means having an outlet connected to the inlet of said pump means and in fluid communication therewith to serve as the supply of said liquid to said pump means, said tank means serving to selectively provide said liquid to said container means, said pump means pumping said liquid from said container means into said receiving means, said first sensor means being operatively coupled to said container means for providing a first signal when the level of liquid in said container means reaches a first position and said second sensor means being operatively coupled to said container means for providing a second signal when the level of liquid in said container means reaches a second position located below said first position, said container means defining a first predetermined volume between said first and second positions, said control means establishing a predetermined number of cycles of operation of said pump means to pump said first predetermined volume from said container means into said receiving means and for providing a third signal indicative thereof, said measuring means responsive to said first and second signals for determining the actual number of cycles of said pump means required to pump said first predetermined volume into said receiving means and for providing a fourth signal indicative thereof, said control means comparing said third and fourth signals and providing an output signal responsive thereto, said pump means being controlled in response to said output signal.

2. The calibration/measuring system of claim 1 wherein said treatment system includes flow rate sensing means for determining the flow rate of said liquid in said line and for providing a seventh signal indicative thereof, said calibration/measuring system operating in response to said seventh signal to provide said output signal to control said pump means in response to changes in the flow rate of said liquid in said line.

3. The calibration/measuring system of claim 1 additionally comprising display means operatively coupled to said fourth signal for providing a display in response thereto.

4. The calibration/measuring system of claim 3 additionally comprising alarm means operatively coupled to said fourth signal for providing an alarm in response thereto.

5. In a treatment system for pumping a liquid into receiving means, said treatment system comprising tank means holding said liquid and having an outlet and controllable pump means having an inlet for cyclically pumping said liquid into said receiving means, the improvement comprising a calibration/measuring system for determining the volume of said liquid pumped each cycle of operation by said pump means, said calibration/measuring system comprising first and second sensor means, hollow container means connected to the outlet of said tank means and in fluid communication therewith for receiving said liquid from said tank means, measuring means, and control means, said hollow container means having an outlet connected to the inlet of said pump means and in fluid communication therewith to serve as the supply of said liquid to said pump means, said tank means serving to selectively provide said liquid to said container means, said pump means pumping said liquid from said container means into said receiving means, said first sensor means being operatively coupled to said container means for providing a first signal when the level of liquid in said container means reaches a first position and said second sensor means being operatively coupled to said container means for providing a second signal when the level of liquid in said container means reaches a second position located below said first position, said container means defining a first predetermined volume between said first and second positions, said control means establishing a predetermined number of cycles of operation of said pump means to pump said first predetermined volume from said container means into said receiving means and for providing a third signal indicative thereof, said measuring means responsive to said first and second signals for determining the actual number of cycles of operation of said pump means required to pump said first predetermined volume into said receiving means and for providing a fourth signal indicative thereof, said control means comparing said third and fourth signals and providing an output signal responsive thereto, said container means being filled by said liquid from said tank means to a third position above said first position and corresponding to the level of liquid in said tank means, said calibration/measuring system also determining the number of cycles of operation of said pump means necessary to cause the level of liquid in said container means to reach said first position from said third position and for providing a fifth signal indicative of said number of cycles.

6. The calibration/measuring system of claim 5 wherein the volume of liquid per unit length of said container means is known and is correlated to the shape of said tank means, said control means providing a sixth signal indicative of the volume of liquid in said tank means in response to said fifth signal.

7. In a treatment system for pumping a liquid into receiving means, said treatment system comprising tank means holding said liquid and having an outlet and controllable pump means having an inlet for cyclically pumping said liquid into said receiving means, the improvement comprising a calibration/measuring system for determining the volume of said liquid pumped each cycle of operation by said pump means, said calibration/measuring system comprising first and second sensor means, hollow container means connected to the outlet of said tank means and in fluid communication therewith for receiving said liquid from said tank means, measuring means, and control means, said hollow container means having an outlet connected to the inlet of said pump means and in fluid communication therewith to serve as the supply of said liquid to said pump means, said tank means serving to selectively provide said liquid to said container means, said pump means pumping said liquid from said container means into said receiving means, said first sensor means being operatively coupled to said container means for providing a first signal when the level of liquid in said container means reaches a first position and said second sensor means being operatively coupled to said container means for providing a second signal when the level of liquid in said container means reaches a second position located below said first position, said container means defining a first predetermined volume between said first and second positions, said control means establishing a predetermined number of cycles of operation of said pump means to pump said first predetermined volume from said container means into said receiving means and for providing a third signal indicative thereof, said measuring means responsive to said first and second signals for determining the actual number of cycles of operation of said pump means required to pump said first predetermined volume into said receiving means and for providing a fourth signal indicative thereof, said control means comparing said third and fourth signals and providing an output signal responsive thereto, said calibration/measuring system additionally comprising means for determining the specific gravity of said liquid.

8. The calibration/measuring system of claim 7 wherein said specific gravity determining means comprises reference means located adjacent said container means for producing a detectable interface, the position of which with respect to the surface of the liquid in said container means being a function of the specific gravity of said liquid, said calibration/measuring system providing an eighth signal when said interface reaches said first position, said measuring means being responsive to said first and eighth signals for determining the number of cycles of said pump means to cause said interface to reach said first position, the volume of liquid per unit length of said container means being known by said calibration/measuring means, whereupon said calibration/measuring means provides a ninth signal indicative of the specific gravity of said liquid.

9. The calibration/measuring system of claim 8 wherein said reference means comprises a hydrometer including a portion defining said interface, and wherein said hydrometer is located within said container means and floating adjacent the surface of the liquid therein with the distance between said interface and the surface of said liquid being a function of the specific gravity of said liquid.

10. The calibration/measuring system of claim 9 wherein said first sensor means provides said first and eighth signals.

11. A method for calibrating the operation of a pump in a treatment system while said pump pumps a liquid into liquid receiving means in said treatment system, said treatment system comprising said pump, controller means, and tank means holding said liquid and having an outlet, said pump having an inlet and being controllable for pumping said liquid into said receiving means, said pump operating cyclically in response to said controller means, said method comprising providing hollow container means connected to said outlet of said tank means and in fluid communication therewith for receiving said liquid from said tank means, said hollow container means having an outlet, said pump having an inlet connected to said outlet of said container means for pumping liquid from said container means into said receiving means, selectively providing said liquid from said tank means to said container means, automatically providing a first signal when the level of liquid in said container means reaches a first predetermined position, automatically providing a second signal when the level of liquid in said container means reaches a second predetermined position lower than said first position, said container means defining a first predetermined volume between said first and second positions, establishing a predetermined number of cycles of operation of said pump to pump said first predetermined volume into said receiving means and providing a third signal indicative thereof, determining the actual number of cycles of operation of said pump necessary to pump said first predetermined volume into said receiving means in automatic response to said first and second signals and providing a fourth signal indicative thereof, and comparing said third and fourth signals and automatically providing an output signal responsive thereto, said output signal serving to control said pump.

12. The method of claim 11 additionally comprising filling said container means with said liquid to a third position higher than said first position and corresponding to the level of liquid in said tank means, determining the number of cycles of operation of said pump necessary to cause the level of said liquid in said container means to reach the first position from said third position and providing a fifth signal indicative thereof.

13. The method of claim 12 wherein the volume of liquid per unit length of said container means is known and correlated to the shape of said tank means, whereupon the volume of liquid in said tank means is determined in response to said fifth signal.

14. The method of claim 11 additionally comprising determining the specific gravity of said liquid.

15. The method of claim 14 wherein the determination of the specific gravity of said liquid is accomplished by coupling reference means to said container means to produce a detectable interface whose position with respect to the surface of the liquid in said container means is a function of the specific gravity of said liquid, determining the number of cycles of operation of said pump to cause said interface to reach said first position and providing a ninth signal indicative thereof, determining the number of cycles of operation of said pump to cause said liquid surface to reach said first position and providing a tenth signal indicative thereof, providing an eleventh signal indicative of the volume of liquid per unit length of said container means, and providing a twelfth signal indicative of the specific gravity of said liquid in response to said ninth, tenth and eleventh signals.

16. A method of determining the volume of a liquid held in a tank in a treatment system, said treatment system comprising a pump for pumping said liquid into liquid receiving means in said treatment system, said tank having an outlet, said pump having and inlet and being controllable for pumping said liquid from said tank into said receiving means, said pump operating cyclically, said method comprising providing hollow container means connected to the outlet of said tank and in fluid communication therewith for receiving said liquid from said tank so that the level of liquid in said container means corresponds to the level in said tank, said hollow container means having an outlet, said pump having an inlet connected to said outlet of said container means for pumping liquid from said container means into said receiving means, selectively providing said liquid from said tank to said container means, automatically providing a first signal when the level of liquid in said container means reaches a first predetermined position, automatically providing a second signal when the level of liquid in said container means reaches a second and lower predetermined position, said container means defining a first predetermined volume between said first and second predetermined position, determining the number of cycles of operation of said pump necessary to pump said first predetermined volume into said receiving means in automatic response to said first and second signals and providing a third signal indicative thereof, filling said container means with said liquid from said tank to a third position corresponding to the level of liquid in said tank, determining the volume per unit length of said container means and its correlation to the shape of said tank and providing a fourth signal indicative thereof determining number of cycles of operation of said pump necessary to cause the level of said liquid in said container means to reach the first position from said third position and providing a fifth signal indicative thereof, and utilizing said fourth and fifth signals to determine the volume of liquid in said tank.

17. A method of determining the specific gravity of a liquid held in a tank in a treatment system, said treatment system comprising a pump for pumping said liquid into liquid receiving means in said treatment system, said tank having an outlet, said pump having an inlet and being controllable for pumping said liquid from said tank into said receiving means, said pump operating cyclically, said method comprising providing hollow container means connected to said tank and in fluid communication therewith for receiving said liquid from said tank, said hollow container means having an outlet, said pump having an inlet connected to said outlet of said container means for pumping liquid from said container means into said receiving means, selectively providing said liquid from said tank to said container means, automatically providing a first signal when the level of liquid in said container means reaches a first predetermined position, automatically providing a second signal when the level of liquid in said container means reaches a second and lower predetermined position, said container means defining a first predetermined volume between said first and second predetermined positions, determining the number of cycles of operation of said pump necessary to pump said first predetermined volume into said receiving means in automatic response to said first and second signals and providing a third signal indicative thereof, coupling reference means to said container means to produce a detectable interface whose position with respect to the surface of the liquid in said container means is a function of the specific gravity of said liquid, determining the number of cycles of operation of said pump to cause said interface to reach said first position and providing a fourth signal indicative thereof, determining the number of cycles of operation of said pump to cause said liquid surface to reach said first position and providing a fifth signal indicative thereof, providing a sixth signal indicative of the volume per unit length of said container means, and calculating said specific gravity based on said fourth, fifth and sixth signals.

* * * * *